United States Patent [19]
Nossen

[11] Patent Number: 4,510,579
[45] Date of Patent: Apr. 9, 1985

[54] FAST CORRELATION SYSTEM
[75] Inventor: Edward J. Nossen, Cherry Hill, N.J.
[73] Assignee: RCA Corporation, New York, N.Y.
[21] Appl. No.: 394,820
[22] Filed: Jul. 2, 1982
[51] Int. Cl.³ ............................................. G06F 11/08
[52] U.S. Cl. ...................................... 364/728; 375/1; 340/825.3
[58] Field of Search .................. 364/728, 819; 382/42; 375/1; 340/825.3, 825.34; 179/2 CA

[56] References Cited
U.S. PATENT DOCUMENTS

| | | | |
|---|---|---|---|
| 3,158,840 | 11/1964 | Baskin | 364/728 |
| 3,237,160 | 2/1966 | Mitchell | 364/728 |
| 3,412,334 | 11/1968 | Whitaker | 364/728 |
| 4,032,885 | 6/1977 | Roth . | |
| 4,100,378 | 7/1978 | Claasen et al. . | |
| 4,122,393 | 10/1978 | Gordy et al. . | |
| 4,145,569 | 3/1979 | Ehrat | 364/728 |
| 4,209,834 | 6/1980 | Rabow | 364/728 |
| 4,227,175 | 10/1980 | Newman | 364/728 |

Primary Examiner—James D. Thomas
Assistant Examiner—Dale M. Shaw
Attorney, Agent, or Firm—Joseph S. Tripoli; Robert L. Troike

[57] ABSTRACT

A receiver in a communication system employing a transmitted signal consisting of a succession of N chip PRS data codes randomly selected from M PRS data codes and each multiplied by an N chip master PRS code to form a succession of encoded PRS codes which together form a continuous encoded PRS signal, and in which the PRS data codes are formed from M successive and overlapping segments of a reproducible source PRS code with each successive PRS data code beginning at a chip in the source PRS code X chips removed from the preceeding PRS data code. The receiver decodes the continuous encoded PRS signal by logic including a first correlator for removing the master PRS code from each received encoded PRS code to recover the generated PRS data code. Further logic comprising a second correlator generates and correlates the M successive and overlapping segments of the reproduced source PRS code with each recovered PRS data code to identify the particular segment which has the greatest correlation with each recovered PRS data code.

4 Claims, 7 Drawing Figures

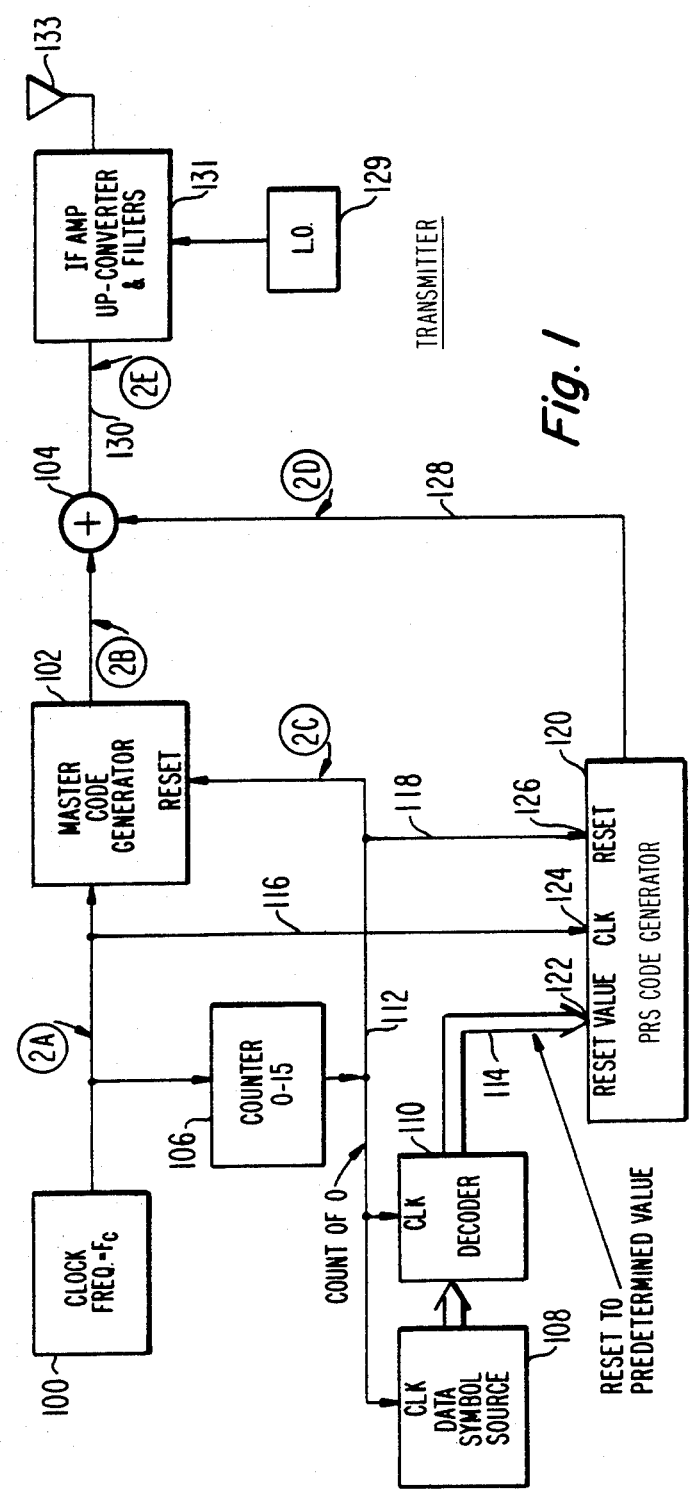
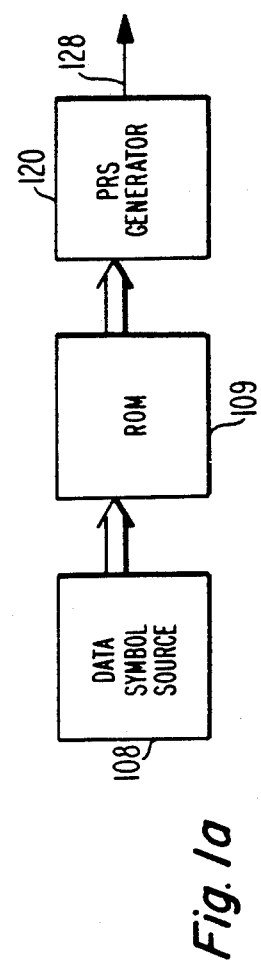
Fig. 1
Fig. 1a

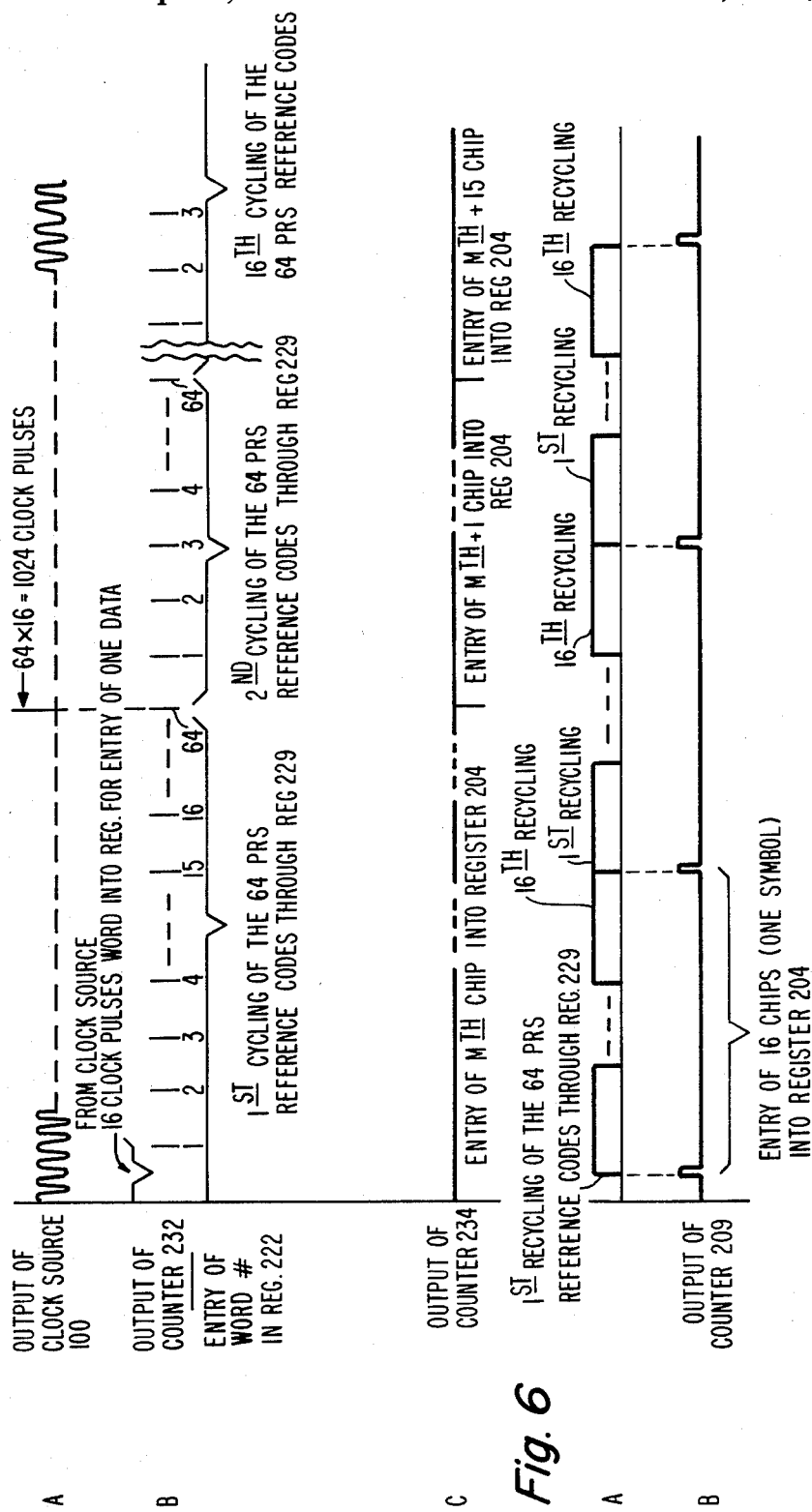

FAST CORRELATION SYSTEM

This invention relates generally to correlation systems and more particularly, to a system and method for rapidly correlating individually received pseudo random sequence (PRS) data codes with M reference PRS codes to determine the identity of the received PRS data code.

In some communications systems, message data in the form of 6-bit data symbols, for example, are supplied by appropriate means, such as a computer or a terminal, to a modulator which translates each one of the 64 possible 6-bit symbols to a respective PRS data code. The modulator is called an M-ary modulator where M=64 ($2^6$) with a 6-bit symbol. Each PRS data code can have N chips, where N is usually some integral power of 2 such as 16, 32, 64 or more. A chip in a PRS data code, and in any pseudo random sequence, is defined as the smallest segment forming the PRS data code and usually has a time period equal to the period of one cycle of the clock signal generating the PRS signal. Such PRS data code can be generated at the transmitter in any one of several ways. For example, the codes can be stored in a ROM and then read out in a desired sequence in accordance with the 6-bit symbols generated at the terminal. Alternatively, they can be generated in real time employing a pulse delete circuit to shift a Q chip source PRS code in a cyclical fashion. A source PRS code is defined herein as a code from which PRS data codes can be formed and will be described in more detail later herein.

In this last mentioned system, for any specific PRS data code, a specified number of clock pulses are deleted from those applied to the source PRS code generator or, alternatively, from a shift register buffer which contains the source PRS output code of a source PRS code generator. It is equally possible to insert extra pulses to advance the code relative to the source PRS code. However, time shifted data code words are subject to erroneous symbol interpretation in the presence of multi-path interference, which can create a delayed version of the PRS data code.

Another method of generating PRS data codes at the transmitter is to enter a predetermined word into a source PRS generator in response to a given 6-bit symbol and then to clock the source PRS generator a number of times as, for example, 16 times to generate a 16 chip predetermined PRS data code whose sequence is known since it is based on the specific 6-bit symbol entered into the source PRS code generator. In this manner, a series of PRS data codes can be generated each of which is shifted one or more chip positions from the previous one. It is apparent that the number of chip positions between successively generated PRS data codes can be precisely determined by the selected sequence of 6-bit symbols. Specifically, the number of shifts in chip positions between successively generated PRS data codes can vary from 0 to 63 in a 6-bit system where the source PRS code is at least 64 chips in length even though each transmitted PRS data code signal is only 16 chips in length.

A PRS data code is defined herein as a complete N chip PRS data word and excludes any chips from an adjacent PRS data code, a PRS reference code is defined as a complete N chip PRS reference code employed at the receiver and excludes any chips from adjacent PRS reference codes. In the system there are M PRS reference codes and M PRS data codes which are duplicates of each other and employed in the correlation process at the receiver. The source PRS code is the PRS signal generated by the source PRS code generator and is the source PRS code from which both the PRS data codes and the PRS reference codes are generated. The source PRS code is much longer than N chips since the PRS data and reference codes are formed from overlapping segments thereof. More specifically, the data and reference codes are formed in a given order from successive and overlapping segments of the source PRS code with each successive PRS data (or reference) code beginning at a chip position in the source PRS code which is X chip positions from the beginning of the previous code, and where X is preferably unity.

A PRS group is any group of N successive chips not forming either a single PRS data code or a single PRS reference code but formed of chips from two adjacent PRS data or reference codes. A master PRS code is a complete N chip code generated at the transmitter and which is employed as a multiplier for each generated PRS data code to form what is defined as an encoded PRS data code. A succession of encoded PRS data codes is defined as an encoded PRS signal. This encoded PRS signal, after being modulated on a suitable carrier, is transmitted to a receiver which must identify and decode the received PRS data codes. More specifically, the receiver must identify the beginning and end of each PRS data code and then identify which of the 64 possible PRS data codes it is.

One method employed in the prior art has been to use 64 separate correlators each of which is designed to identify one of the 64 possible received PRS data codes. The received encoded PRS signal is supplied to all 64 correlators, only one of which will substantially match any given received PRS data code. In that particular correlator a maximum correlation pulse will be generated when the received PRS data code is completely stored therein. Logic must be provided to identify which of the 64 correlators generates the largest pulse and at what time. From this information the received PRS data code can be identified. Obviously, 64 separate correlators represents a large amount of hardware.

An alternative implementation of a viable 64-ary correlator uses a time sequential approach where a single correlator is time shared among all 64 possible PRS reference codes. More specifically, the 64 PRS reference codes are passed rapidly through the correlator during each chip period of the received PRS data code which is also being supplied to the correlator, but at a much slower chip rate. The maximum correlation pulse will occur when the received PRS data code is fully entered into the correlator and during that particular chip period when the corresponding PRS reference code is fully entered into the correlator. However, a correlation pulse almost as large will occur when only 15 out of 16 chips of the received PRS data code and the corresponding PRS reference code are in the correlator. In the presence of noise the amplitudes at the two correlation pulses might be indistinguishable making it quite difficult to determine when precise correlation of the completely received PRS data code and the complete corresponding PRS reference code occurs, i.e., when both are completely in the correlator. Therefore, the contents of the correlator might not truly contain the complete received PRS data code when maximum correlation is indicated which could lead to erroneous decoding. Additional logic is required to regenerate the corresponding 6-bit symbol after proper identification of such received PRS data code.

In the present invention, the identification of any one of the possible 64 received PRS data codes is accomplished with a single time shared correlator and the data symbols are defined directly as a result of the identification of the received PRS data code so that no additional logic is required to regenerate the 6-bit symbols after identification of the PRS data code.

The invention provides a decoder for a communication system employing a transmitted signal consisting of a succession of N chip PRS data codes randomly selected from M PRS data codes and each multiplied by an N chip master PRS code to form a succession of encoded PRS codes which together form a continuous encoded PRS signal, and further in which the PRS data codes are formed in a given order from successive and overlapping segments of a reproducible source PRS code. Each successive PRS data code in the given order begins at a chip in the source PRS code which is X chips removed from the preceding PRS data code in the given order.

The decoder for decoding the continuous encoded PRS signal comprises first correlating logic for removing the master PRS code from each of the received encoded PRS codes to recover the generated PRS data codes. Logic means comprising second correlating logic for generating and correlating M PRS reference codes with each recovered PRS data code and with each of the PRS reference codes being identical to one of the M PRS data codes. Also provided is logic for determining and identifying the particular PRS reference code which has the greatest correlation with each recovered PRS data code.

In the drawings:

FIG. 1 is a block diagram of the transmitter employed in the system;

FIG. 1a shows an alternative way of generating PRS data codes;

FIG. 5 is a set of waveforms illustrating various signals employed in the receiver of FIG. 4; and FIG. 6 shows additional waveforms of signals employed in the receiver of FIG. 4.

Figure 2:
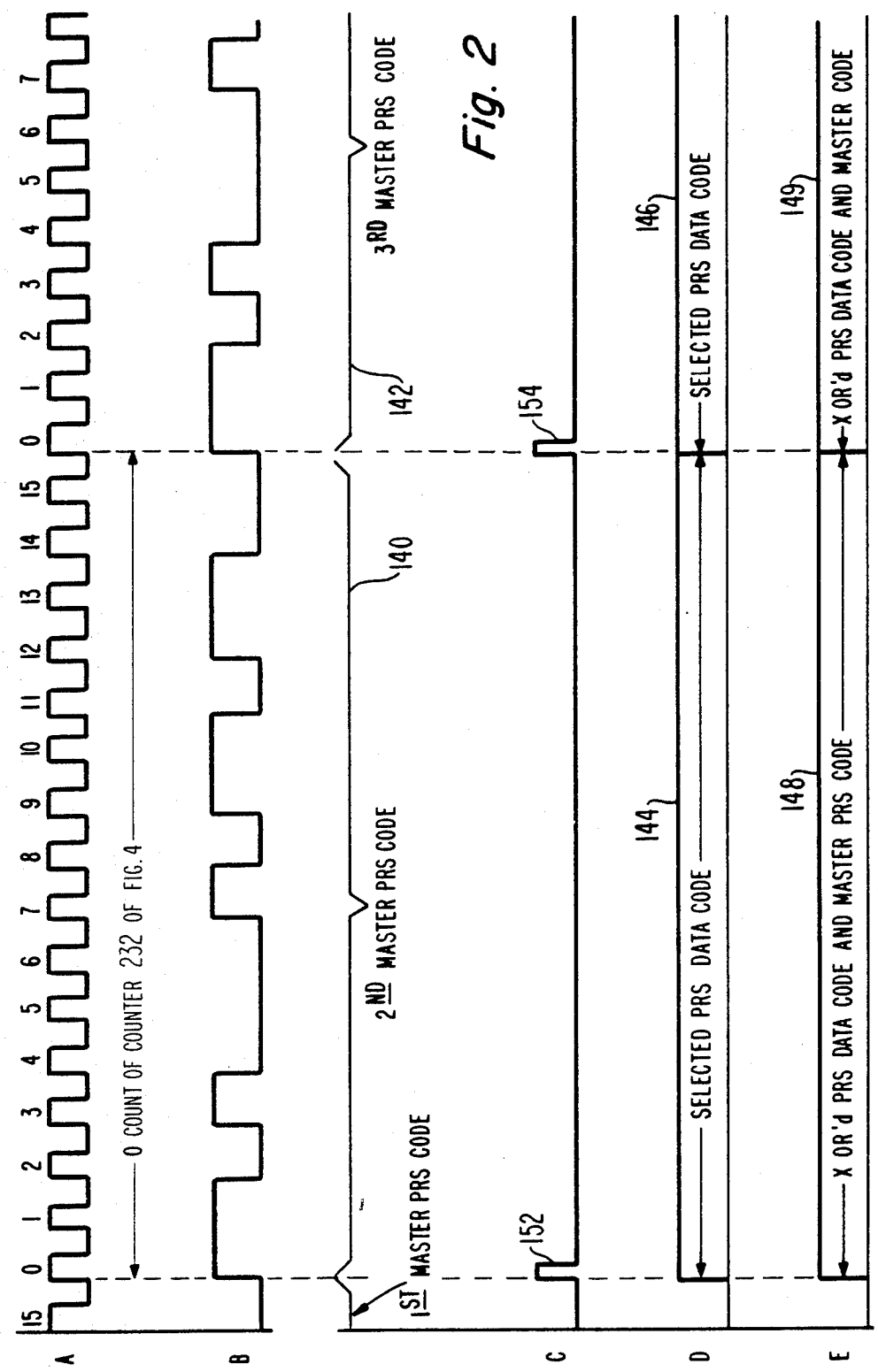
FIG. 2 is a set of waveforms of various signals generated in the transmitter of FIG. 1.

Referring now to FIG. 1, a clock pulse source 100 generates a clock signal having a repetition rate $f_c$ as shown in waveform A of FIG. 2, and which is supplied to the master PRS code generator 102, the source PRS code generator 120, and also to counter 106. The master code generator 102 generates a master PRS signal shown in waveform B of FIG. 2 and which, in the example being described, contains 16 chips with each chip period equaling the cycle period $1/f_c$ of clock pulse 100. The master PRS code is iterative in that it repeats itself indefinitely as long as the system is operating and is supplied serially to one input of Exclusive OR (XOR) gate 104.

The source PRS generator 120 also generates PRS codes but these codes differ from the master PRS code in that the output of the source PRS generator 120 can be any one of 64 PRS data codes, each of which is time synchronous with one of the master PRS codes from master PRS code generator 102. The PRS data codes are supplied from generator 120 via lead 128 to the second input of XOR gate 104.

Two master PRS codes 140 and 142 are shown in waveform B of FIG. 2. Two time synchronous PRS data codes 144 and 146 generated in source PRS generator 120 (FIG. 1) are represented by the bar graph D of FIG. 2. The resulting XOR'd signals appearing on output terminal 130 of XOR gate 14 are shown in bar waveform E of FIG. 2 as segments 148 and 149.

For purposes of brevity the waveforms A–E of FIG. 2 and also the waveforms of FIGS. 5 and 6 will hereinafter be designated as waveform 2A or waveform 2B rather than as waveform A or waveform B of FIG. 2.

The pulses 152 and 154 of waveform 2C appear at the count-of-0 output of 0–15 binary counter 106 and in cooperation with 6-bit data symbol source 108 and decoder 110, function not only to time the selection of the particular one of 64 possible PRS data codes generated in PRS generator 120 but also to synchronize said PRS data codes with the master PRS codes generated in master code generator 102.

More specifically, counter 106 counts through its 16 count capacity every 16 pulses from clock source 100. At every 0 count of counter 106, the master PRS code generator 102 is reset to a predetermined value so that during the next 16 pulses from clock source 100 the master PRS code generator 102 will generate the 16 chip master PRS code signal and return to its predetermined value when the counter 106 again reaches its 0 count state.

Also at the 0 count of counter 106 the data symbol source 108 is clocked to present the next data symbol to decoder 110 which is also clocked at the count of 0 of counter 106 to receive and decode such data symbol. The decoded data symbol generated by decoder 110 is supplied to the "reset value" input 122 of PRS generator 120 in response to the count of 0 from counter 106 being supplied to reset input 126 of source PRS generator 120 via lead 118.

Thus, at the 0 count of counter 106 the operation of the transmitter is synchronized in that the master PRS code generator 102 begins to generate the master PRS code serially at such time and the data symbol source 108 presents a new data 6-bit symbol to decoder 110 which decodes such new symbol and supplies the decoded value serially to source PRS code generator 120.

In the particular encoding scheme employed in the invention, the 64 possible 6-bit data symbols are related to the PRS data codes such that the data symbols having successive values decimal 1, 2, 3–64 will correspond to successive PRS data codes spaced one chip apart as they are successively generated by source PRS code generator 120. Such an arrangement enables direct generation of the data symbols at the receiver immediately upon identification of a received PRS data code, as will become more apparent from the discussion of FIG. 4 set forth later herein.

The output from XOR gate 104 is up-converted (modulated) upon a suitable carrier via the appropriate IF amplifiers, up-converter, and filters represented by block 131, and local oscillator 129, and then transmitted via antenna 133.

Figure 3:
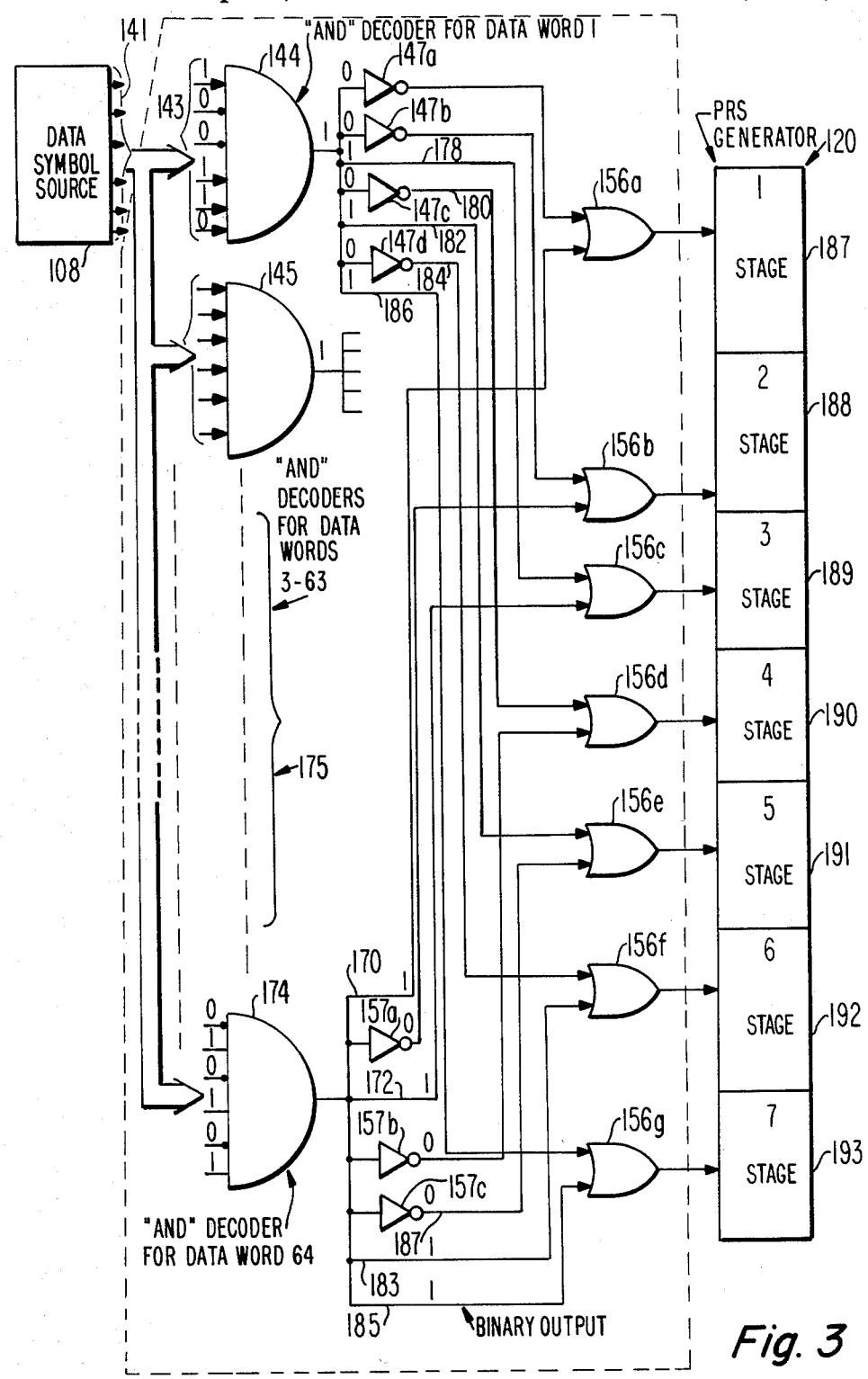
FIG. 3 is a logic diagram of a portion of FIG. 1.

Referring now to FIG. 3 there is shown a detailed logic diagram of one suitable embodiment of the decoder 110 of FIG. 1. In FIG. 3 the six output leads 141 of data symbol source 108 are supplied in parallel to the six input leads, such as six input leads 143, of each of 64 AND gate decoders, arranged in an order but of which only three are shown, and identified as AND gate decoders 144, 145, and 174. The order of the AND gate decoders is such that the first AND gate decoder 144 will cause the 7 stage source PRS generator 120 to produce a first given PRS data code. The next AND gate decoder 145 will cause source PRS generator 120 to produce a PRS data code shifted one chip position with respect to the first PRS data code but with the remaining first 15 chips thereof being identical to the last 15 chips of the first given PRS data code.

Each of these AND gate decoders are responsive to only one of the 64 possible 6-bit data symbols to produce a binary 1 (high level signal) output. For example, AND gate decoder 144 is responsive to the 6-bit data symbol 100110 to produce a 1 at the output of gate 144. This binary 1 (high level signal) is supplied to the seven OR gates 156a, 156b, 156c, 156d, 156e, 157f and 156g either directly or through an inverter such as inverters 147a, 147b, 147c, 147d, 157a, 157b, and 157c. The presence or the absence of an inverter forms the particular binary value responsive to the energization of any AND gate decoder and which will be entered into the seven stage source PRS generator 120. The source PRS code generator 120 is selected so that it will have a minimum iterative source PRS output code of 64 chips, the minimum of 64 chips being necessary in order for the 64 possible PRS data codes to be shifted one from the other by at least one chip position, that is to say a selected 16 bit PRS data code plus 63 shifts of one chip position dictates the minimum requirement of a 64 chip position source PRS code being generated by source PRS code generator 120.

In the example being discussed, it will be assumed that the 64 possible PRS data codes will each, in order, be shifted from the prior PRS data code by one chip position. Thus, as discussed above, the PRS data code generated in response to energization of AND gate decoder 144 will be shifted one chip position with respect to the PRS data code generated by the energization of AND gate decoder 145, and the PRS data code generated by source PRS generator 120 in response to activation of AND gate decoder 145 will be shifted one chip position with respect to the output of the next AND gate decoder (not shown in FIG. 3).

To complete the cycle the PRS data code produced in source PRS generator 120 as a result of the value placed therein in response to energization of AND gate decoder 174 will be shifted one chip position with respect to the PRS data code originated by the first AND gate decoder 144. The foregoing obviously involves a PRS generator 120 which will produce a repeating source PRS code of at least 64 chips.

Summarizing the foregoing, each of the 64 AND gate decoders 144–174 will, when enabled, supply a 7-bit code to the seven OR gates 156a–156g with the 1's and 0's of such 7-bit code being determined by the absence or presence of inverters, such as inverters 147a–147d at the output of AND gate decoder 144. Each of these 7-bit codes values, when entered in parallel into the 7 stages of source PRS generator 120 and then clocked serially therefrom, will generate a PRS data code which is shifted one chip position with respect to that produced by enablement of the next successive AND gate decoder 145.

It is apparent that the AND gate decoders such as AND gates decoders 144, 145 and 174, can be enabled in any preselected sequence but always with the 16-bit PRS data code generated as a result thereof maintaining a Z chip distance from any other PRS data code generated by enablement of any other AND gate decoder, where Z is the difference in the predetermined order of the enabled AND gate decoder and said any other AND gate decoder.

FIG. 1A shows another means for implementing the decoder 110 of FIG. 1. The rationale of FIG. 1A is to employ the data symbols from source 108 as addresses to a read only memory (ROM) 109 whose word locations contain the desired PRS data code words which are then supplied in parallel to the PRS generator 120. A third alternative is to have the desired PRS data codes read directly from the ROM and into a shift register (not shown) from whence they are read serially into XOR gate 104, thus eliminating the need for the PRS generator 120.

Figure 4:
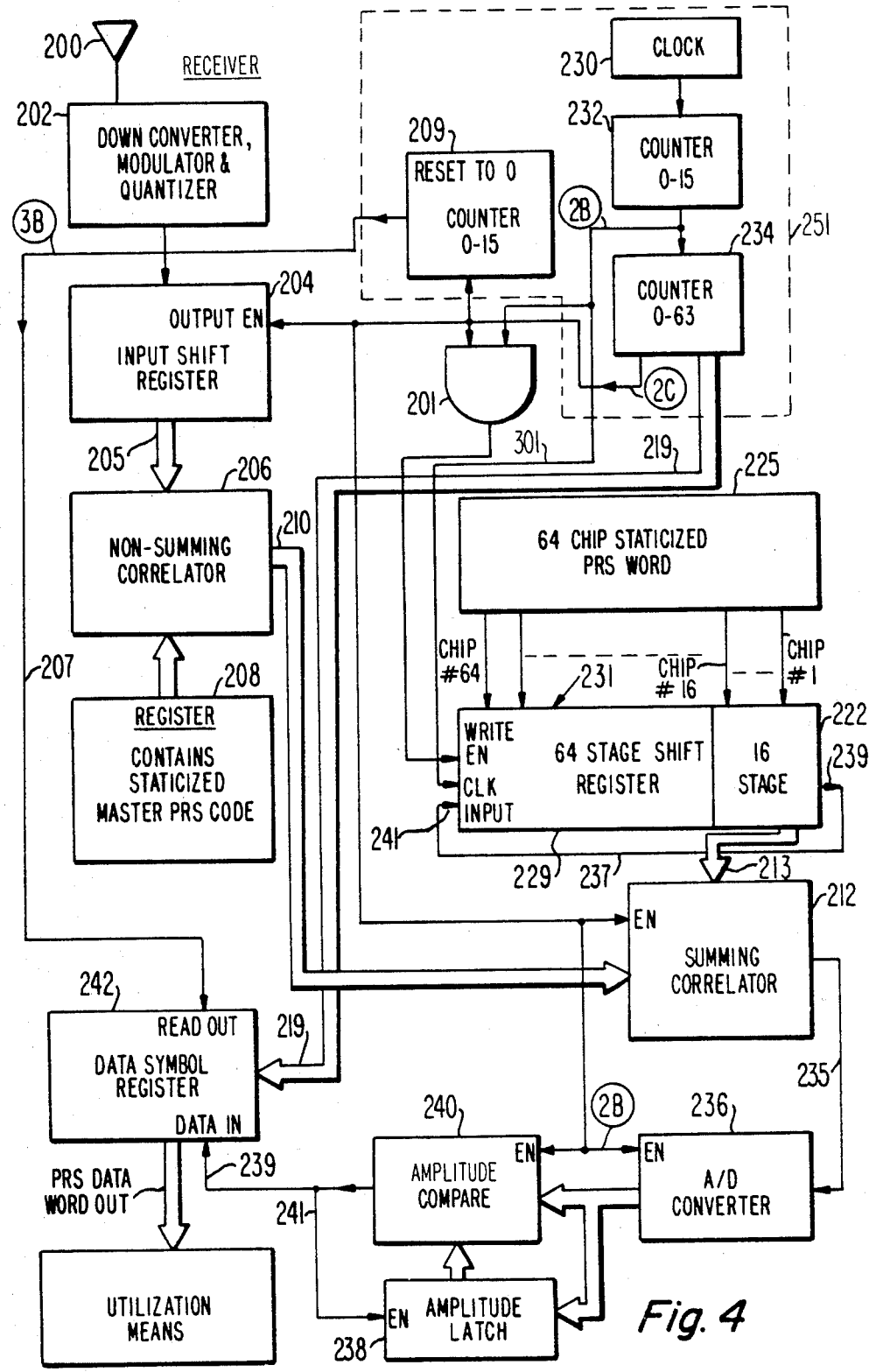
FIG. 4 is a block diagram of the receiver.

At the receiver shown in FIG. 4, the received signal is received via antenna 200, down-converted, demodulated, and digitized by appropriate logic 202. The signals supplied from logic 202 to input shift register 204 are substantially the same as the signals supplied from XOR gate 104 at the transmitter of FIG. 1. Such received signal is thus in the form of a continuous stream of chips which now must be decoded and identified.

This serial stream of chips is supplied to a non-summing correlator 206 which also receives at a second input the staticized master PRS code from register 208. The staticized master PRS code can remain permanently in register 208 and need not be shifted. As the received stream of chips is entered serially into input shift register 204 it will be presented in parallel via bus 205 to a first input of correlator 206. When the master PRS code component in the stream of received chips becomes aligned with the master PRS code present in register 208 the non-summing correlator 206 will function to strip the master code from the received and aligned encoded PRS data code leaving only the original PRS data code which was generated at the output of PRS generator 120 of the transmitter of FIG. 1, as shown in waveform 2D. This stripped PRS data code is supplied to first input terminals 211 of summing correlator 212 via the 16 lead bus 210 where it is compared with the contents of shift register 222 which is supplied to the second input terminals 213 of summing correlator 212. As will be discussed in detail later herein 16 stage shift register 222 is part of a larger 64 stage shift register 231 and receives, in rapid succession, all of the 64 PRS reference codes.

Returning to input shift register 204 of FIG. 4, it is to be noted that each time a new chip is received in shift register 204 the contents thereof and the staticized master PRS code in register 208 are compared in correlator 206 with the results being supplied in parallel to summing correlator 212. However, as mentioned above, it is only when the master PRS code present in shift register 204 is aligned with the staticized master PRS code in register 208 that the master PRS code is stripped from the 16 chip encoded PRS data code present in register 204, thereby leaving a PRS data code which will correlate with one of the 64 PRS reference codes in summing correlator 212, as will be discussed later. All of the remaining correlations between the constantly changing PRS groups of 16 chips in shift register 204 and the staticized master PRS code in register 208 will produce results on output bus 210 which will not correlate with any of the 64 reference PRS reference codes since the master PRS code was not stripped therefrom.

Assume now that a PRS data code, from which the master PRS code has been stripped, is entered into summing correlator 212. Such PRS data code will remain resident in summing correlator 212 for one input chip period.

During this one chip period all of the 64 reference PRS code signals will appear in the 16 stages of shift register 222 (see waveforms 5B and 5C). As mentioned above, shift register 222 is connected in tandem to a 48 stage shift register 229 to form what is, in effect, a single 64 stage shift register 231. The appearance of all 64 PRS reference codes in shift register 222 during a single input chip period is effected in the following manner. A 64 chip source PRS code is staticized in register 225 and is the same source PRS code which would be generated by the source PRS generator 120 of FIG. 1 if allowed to run continuously.

At every 16th received input signal chip (waveform 6A) the concurrency of the 0 count of counter 209 (waveform 6B) and the 0 count of counter 232 will, via AND gate 201 (FIG. 4), cause the 64 chip staticized source PRS code in register 225 to be written in parallel manner into the 64 stage shift register 231 to insure synchronism of the generation of the 64 PRS reference codes with the corresponding input chip of a received PRS code group. Following such write-in the counter 232 will cause the contents of shift register 231 to advance one stage at each of the 0 counts of counter 232 via lead 301. Since counter 234, in essence, divides by 64, which is the total number of PRS reference codes and therefor defines the input chip rate, the count of 0 appearing at the output of counter 232 will advance the contents of shift register 231 64 times during each chip period of the input signal and thus cause all of the 64 PRS reference codes to appear in the 16 stage shift register 222 (FIG. 4) during each input chip period.

It is only when that particular PRS reference code of the 64 possible PRS reference codes which matches the input PRS data code is fully entered into shift register 222 that such PRS reference code can become aligned with the input PRS data code stored in correlator 212 and the maximum correlation pulse be generated in summing correlator 212. Such maximum correlation pulse is supplied to A/D converter 236 whose digitized output is next supplied to amplitude compare circuit 240 and amplitude latch logic 238. Amplitude compare logic 240 and amplitude latch logic 238 cooperate to receive each of the digitized correlation pulses from A/D converter 236 and to store the last largest received pulse in amplitude latch 238. When a new and larger digitized pulse is received from A/D converter 236 the amplitude compare logic 240 will compare such newly received pulse with the contents of amplitude latch 238 and, if the new pulse is larger, will enable latch 238 via lead 241 to store the newly received pulse in place of the older one. Thus, latch 238 will always contain the last largest received digitized correlation pulse.

Accordingly, for each received 16 chip code word there will be 16 circulations of the 64 PRS data words through shift register 222 (FIG. 4), thus producing a large number of correlations during the reception of a complete 16 chip PRS data code word. All of these correlations except one will produce low output pulses from the correlator 212 since, in fact, almost no correlation occurs. It is only when the received PRS data code, stripped of the master PRS code, is entered into the summing correlator 212, and the corresponding PRS reference code appears in shift register 222 that the maximum correlation pulse will be produced by summing correlator 212. Thus, over each 16 chip period there will be only one such maximum correlation pulse whose amplitude will be detected and stored in latch 238 in the manner described above.

At the same time as this maximum correlation pulse is detected by amplitude compare circuit 240 the data symbol register 242 will be enabled by an output from amplitude compare circuit 240 on lead 239 to receive and store the contents of counter 234 via bus 219. As discussed above, at the time of occurrence of such latest largest correlation pulse the counter 234 will contain the data symbol corresponding to the PRS data code stored in correlator 212. Thus, the data symbol register 242 will, in fact, then have stored therein the corresponding received data symbol. As discussed above the coding of the system is such that the counts contained in counter 234 corresponding to given PRS data codes are in fact, the corresponding data symbols.

After every 16th received input chip the contents of data symbol register 242 are read out by a timing pulse (waveform 6B) supplied from 0–15 counter 209 of FIG. 4 via lead 207. It is not necessary that the 0 count of counter 209 coincide with the beginning of a received PRS data code since at least one full received PRS data code must be received during each 16 input chip period and entered into input shift register 204.

The counter 209 is part of the overall timing system 251 which includes clock pulse source 230, 0–15 counter 232 which receives at its input the output of clock pulse source 230, and a 0–63 counter 234 which is responsive to the 0 count output of counter 232. The clock pulse rate from clock source 230 can be 2.4576 MHz as shown in waveform 5A which provides a 2400 Hz symbol rate.

What is claimed is:

1. In a communication receiver system for receiving and decoding an encoded PRS signal consisting of M Pseudo Random Signal (PRS) data codes each being N chips long with each data code being multiplied by an N chip master PRS code to form an N chip encoded PRS code and with a plurality of said N chip encoded PRS codes forming an encoded PRS signal, and with said M, N chip PRS data codes also forming a reference source PRS code comprised of overlapping and partially-in-common overlapping segments with said reference PRS code segments arranged in an order so that each of said received PRS data codes corresponds to a PRS reference code segment and in which the first chip of each received PRS data code segment begins correlation with that chip in said PRS reference source code which is removed X chips from the prior adjacent PRS reference PRS code segment and arranged in the same order as the PRS data codes in said source data code segments and correlating means for comparing each PRS reference code received segment with each received PRS data code, and comprising:

means for reproducing said master PRS code at said receiver;

means for correlating each successive group of N chips of said encoded PRS signal with a group of N chips, said group of N chips being defined as occurring when each new chip is received, means for multiplying each new group of N chips by said reproduced master PRS code to remove said master PRS code from the received encoded signal when a new group of N chips forms a new received encoded PRS code to thereby leave an N chip PRS data code;

means for generating said PRS reference source codes at said receiver; and means for correlating each successive group of N chips, after being correlated with said master PRS code, with each successive segment of said PRS reference source code to determine the particular segment of said generated PRS reference source codes which has the greatest correlation with any group of N input chips, after correlation with said master PRS code, over N input chips.

2. In a communication system employing a transmitter for transmitting a signal consisting of a succession of N chip Pseudo Random Signal (PRS) data codes randomly selected from M, N chip PRS data codes and each multiplied by an N chip master PRS code to form a succession of encoded PRS data codes which together form a continuous encoded PRS signal, and in which said PRS data codes are formed in a given order from successive and overlapping segments of a reproducible source PRS code with each successive PRS data code in said given order beginning at a chip position in said source PRS code X chips removed from the preceding PRS data code in said given order, a decoder for decoding said continuous encoded PRS signal and comprising:

first correlating means for removing said master PRS code from each of the received encoded PRS data codes to recover the PRS data codes;

logic means at said decoder comprising second correlating means for generating and correlating said overlapping segments in said given order with each recovered PRS data code, and with each of said overlapping segments being identical to a random one of said received M PRS data codes;

means at said decoder for producing overlapping reference PRS codes in the same given order as said reproducible source PRS codes are arranged at said transmitter, with adjacent PRS data codes X chips removed from each other to form overlapping segments with each segment comprising a PRS reference code; and means for determining and identifying the particular overlapping segment of said overlapping reference PRS codes which has the greatest correlation with any received PRS data code.

3. In a communication system employing a transmitted signal consisting of a succession of N chip PRS data codes randomly selected from M PRS data codes and each multiplied by an N chip master Pseudo Random Signal (PRS) code to form a succession of encoded PRS codes which together form a continuous encoded PRS signal, and in which said PRS data codes are formed in a given order from successive and overlapping segments of a reproducible source PRS code with each successive PRS data code in said given order beginning at a chip in said source PRS code X chips removed from the preceding PRS data code in said given order, a method of decoding said continuous encoded PRS signal comprising the steps of:

reproducing the master PRS code at the receiver;

correlating the reproduced master PRS code with the received encoded PRS signal to remove said master PRS code from each received PRS data code and to identify the beginning and end of said each received PRS data code;

generating said reproducible source PRS code;

comparing all of the successive and overlapping segments of said source PRS code with each of said identified PRS data codes; and identifying that segment of said source PRS code which provides the greatest correlation with each of said identified PRS data codes.

4. In a communication system employing an encoded signal consisting of M, N chip, Pseudo Random Signal (PRS) data codes with each data code being multiplied by an N chip master PRS code to form a continuous encoded PRS signal, and with said M, N chip PRS data codes all being formed in a given order from successive and overlapping segments of a Q chip source PRS code with each successive PRS data code in said given order beginning at a chip in said source PRS code which is removed X chips from the adjacent PRS data code in the said given order, a method of decoding said continuous encoded PRS signal comprising the steps of:

reproducing the master PRS code at the receiver;

multiplying the reproduced master PRS code with the received continuous encoded PRS signal each time a new chip is received to remove the master PRS code from the received encoded PRS code when alignment occurs between said reproduced master PRS code and a master PRS code component of the received continuous encoded PRS signal;

reproducing said reproducible source PRS code;

transferring each of said M successive and overlapping segments of said reproduced source PRS code into a correlator at least once during each chip period of the received continous encoded PRS signal;

correlating each N chip group of received encoded PRS signal, after each chip thereof is received and after multiplication by said reproduced master PRS code, with each segment of said source PRS code, where a group is defined as any group of N consecutive chips of the received encoded PRS signal; and identifying which segment produces the largest correlation during the reception of each N chips of said encoded PRS signal.

* * * * *